April 25, 1933. S. A. NORRICK 1,905,490
MOLDING MACHINE
Filed Dec. 14, 1929 6 Sheets-Sheet 1

Fig.1

Inventor:
Stanley A. Norrick
By Rector, Hibben, Davis & Macauley Attys.

April 25, 1933.  S. A. NORRICK  1,905,490
MOLDING MACHINE
Filed Dec. 14, 1929   6 Sheets-Sheet 3

Inventor
Stanley A. Norrick
By Rector, Hibben, Davis & Macauley Attys.

April 25, 1933.  S. A. NORRICK  1,905,490
MOLDING MACHINE
Filed Dec. 14, 1929  6 Sheets-Sheet 6

Inventor
Stanley A. Norrick
By Rector, Hibben, Davis & Macauley Attys

Patented Apr. 25, 1933

1,905,490

UNITED STATES PATENT OFFICE

STANLEY A. NORRICK, OF NEWCASTLE, INDIANA, ASSIGNOR TO THE PERFECT CIRCLE COMPANY, OF HAGERSTOWN, INDIANA, A CORPORATION OF INDIANA

MOLDING MACHINE

Application filed December 14, 1929. Serial No. 413,979.

My invention relates to molding machines and more particularly to a machine of this type which is intended for the preparation of molds for the casting of piston rings.

One object of my invention is to devise a machine for preparing piston ring molds which is constructed and arranged to mechanically pack, or ram, the molding sand around the pattern and to then separate the formed mold from the pattern.

A further object is to devise a machine of the character described which forms molds for the individual casting of piston rings, each mold being shaped for the casting of a plurality of rings and so arranged as to permit the packing of several molds to receive the hot metal as a mold unit during the pouring operation.

A further object is to provide a molding machine as above set forth which operates with great rapidity and precision in effecting the sand ramming operation and the separation of the mold from the pattern, the latter step being performed during the releasing movement of the ramming members with a consequent improvement in the molding time required.

A further object is to incorporate in a machine having the foregoing characteristics a mechanism for separating the mold from the pattern by holding the former against one of the ramming members by an equalized pressure during the releasing movement of the other ramming member which carries the pattern plate, thereby securing a controlled, uniform, and true axial lifting, or separating, movement of the mold.

A further object is the inclusion in a molding machine of means comprising a heater for preventing the adhesion of the damp molding sand to the squeezing head and pattern plate during the separation of these members, thereby securing a superior, smooth and regular mold.

As stated above, the present invention relates to a machine for making molds for the individual casting of piston rings and is directed more particularly to a machine of this type which is intended for the forming of molds on the basis of a large scale production. Accordingly, the machine has been so constructed and arranged that the molds may be made with great rapidity and easily removed therefrom without injury. Except for the filling of the successive flasks with the sand, the machine is entirely mechanical in its operation and functions to closely pack the sand around the pattern by a simple squeezing operation and to thereafter separate the mold from the pattern by a characteristic movement, free from any danger of distorting the mold and insuring the true casting of the individual ring in all locations thereof. All movements of the machine are under the immediate control of the operator by means of valves which are located in a suitable arrangement of fluid pressure lines, air being utilized as an actuating medium.

These and further objects of my invention will be set forth in the following specification, reference being had to the accompanying drawings, and the novel means by which said objects are effectuated will be definitely pointed out in the claims.

The numeral 20 designates the frame of my improved molding machine which is movably supported on a pair of front wheels 21 and the rear wheel 22. At the rear end of the machine, an arm 23 extends upwardly from the frame 20 for the pivotal support of the lower end of a yoke 24 by means of a pin 25. Forwardly of the yoke 24, a second yoke 26 is pivotally supported at its lower end on said frame by a pin 27, said yokes being generally parallel for the position shown in Fig. 1 with the yoke 26 having a greater length than the yoke 24, and extending upwardly for pivotal engagement at their upper ends by means of pins 27ª and 28, respectively, with a beam 29. Said beam is connected at its rear end to the yoke 24 by the pin 27ª and projects forwardly of the yoke 26 to form a head 30 which is flanged as at 31 around its lower side. A U-shaped handle 32 is secured to the head 30 for moving the same as hereinafter described. A plurality of adjusting screws 33 pass through the flange 31 for threaded engagement with a squeeze plate 34 which is smooth on its under side for a purpose hereinafter explained. A recess 35 is centrally formed on the squeeze plate 34 for the reception of a block 36 having a concave, upper face 37. Disposed above said block is a complementary block 38 having a convex lower surface 39 which rests on the surface 37, the block 38 being seated in a recess 40 provided on the under side of the head 30. The blocks 36 and 38 together form substantially a universal joint and permit an easy adjustment of the squeeze plate 34 by means of the screws 33 to any desired position. The plate 34 may be provided with any desired number and arrangement of reenforcing ribs 34ª for resisting the strains of the squeezing operation and may be further recessed as at 41 to receive a heater element 42, preferably electrically operated and of an annular shape.

It will be apparent from the above description that the character of the mounting of the squeeze plate 34 on the frame 20 will permit its retraction from the full line position shown in Fig. 1 to the dotted line position, indicated by the numeral 43, in said figure for a purpose hereinafter explained. In order to limit the aforesaid movement of said head, one end of a threaded link 43 is pivotally secured by means of a pin 44 to the yoke 26 and the other end passes through a boss 45 provided on the arm 23 to receive on its outer end a stop nut 46 which limits the forward movement or a movement to squeezing position, of the plate 34. Generally, a nut 47 threaded on the link 43 on the opposite side of the arm 23 will limit the rearward movement of said plate, or a movement to the dotted line position indicated in Fig. 1. Suitable lock nuts 48 are provided for holding the aforesaid stop nuts in any desired adjusted position. Accordingly, the plate 34 may not only be adjusted by means of the screws 33 in any generally horizontal plane, but also may be adjusted laterally in order to axially align the same with the other squeezing mechanism hereinafter described.

A squeeze cylinder 49 is mounted on the frame 20 between the wheels 21 and is supplied with air pressure through the lower end thereof by means of a hose connection 50 which is joined at its opposite end to a T-fitting 51. This fitting also connects by means of a hose 52 to a pop valve 53 of any desired construction which is supported on the beam 29. Said valve will be adjusted for automatic release upon being actuated by a predetermined pressure as hereinafter described. The fitting 51 also connects by means of a pipe 54 with a valve housing 55 which may be supported in any approved manner on the side of the cylinder 49 or elsewhere on the frame 20. The housing 55 is provided with a horizontal passage 56 from which extends downwardly spaced, exhaust and inlet passages 57 and 58, respectively. The exhaust passage 57 communicates with the atmosphere and is provided with a valve seat 59 which is engaged by the head of a valve 60 suitably mounted in said housing. The valve 60 is biased toward a closing position with respect to the seat 59 by means of a spring 61 interposed between the under side of the valve head and a convenient portion of the housing 55. Similarly, the inlet passage 58 is provided with a valve seat 62 which is engaged by the head of a valve 63 that is appropriately mounted in the housing 55 and which is biased toward a closing position by means of a spring 64 interposed between the head of said valve and a convenient portion of said housing. Said inlet passage communicates by means of a pipe 65 with a four-way fitting 66 which in turn communicates by means of a pipe 67 with any desired type of air supply. The other openings of the fitting 66 communicate by means of hoses 68 and 69 with valves for controlling the admission of air to the vibrating mechanism and to the pipes which deliver air to the lift and sprue pin cylinders, respectively, as hereinafter described.

The valve handle 70 is pivotally supported as at 70ª on the housing 55 and is provided with a hand grip 71 which is disposed for convenient access by the operator at the front portion of the machine. Except for the hand grip portion, the handle 70 is generally channel-shaped in cross section and is so disposed as to straddle the stems of the valves 60 and 63 which project upwardly through the top of the housing 55, as shown clearly in Fig. 1. A boss 72 is provided on the underside of the handle 70 for engagement with the end of the stem of the valve 63 the handle also carries a stud 73 which is axially aligned with the stem of the valve 60 for engagement therewith, as will be presently described. In the position of the handle 70 as shown in Fig. 1, the stud 73 actuates the valve 60 to normally keep the same in a retracted position from the valve seat 59, thus opening the exhaust passage 57 to the atmosphere, against the valve spring 61 by means of a spring 74 which encircles a rod 75, the upper end of said rod being pivotally secured to said handle and the lower end thereof being slidable through a foot 76 which projects from the housing 55. It will also be noted from Fig. 1 that, in the position of the valve handle 70 as shown, the boss 72 is spaced from the stem end of the valve 63, thus permitting a closure of said valve and denying the admission of air pressure to the housing 55. When the operator presses downwardly on the hand grip 71, the spring 61 will close the exhaust valve 60 and the boss 72 will open the inlet valve 63, thereby admitting air pressure to the squeeze cylinder 49.

A piston 77 is slidably mounted in the cylinder 49 and the apron thereof extends upwardly beyond the upper end of said cylinder and is flanged outwardly as at 78. An elongated slot 79 is formed in the wall of the piston 77 for cooperative relation with a stop pin 80 which is fixed in said cylinder, the engagement of said pin with the upper and lower ends of said slot serving to absolutely limit the corresponding movements of said piston. A base plate 81 is carried on the flange 78 and secured thereto in any approved manner, and on the upper side of said plate is secured a base ring 82 by means of cap screws 83.

A base 84 of circular shape and a generally trapezoidal cross-section is disposed above the ring 82 and includes a pair of lugs 84ª which are attached to said ring and the plate 81 by means of the screws 83. Between the underside of the base 84 and the upper side of the ring 82, an annular gasket 85 is interposed in order to provide a seal for the annularly disposed and equally spaced cylinders 86 which are formed integrally with the base 84 and positioned around the circumference thereof. Wear liners 87 are inserted in each of the cylinders 86 and the lower portions of said cylinders have communicative relation with each other by means of an annular groove 88 formed in the underside of the base 84. Said groove communicates by a pipe 89 with one side of a reducing valve 90, the other side of which is connected to a T-fitting 91 having a bleed hole 92 that serves as an exhaust for the cylinders 86. The fitting 91 in turn communicates by a pipe 93 with a valve 94 of any approved construction and whose operation is controlled by a knee lever 95.

A piston 96 is slidably mounted in each cylinder 86 and is normally maintained in the lower portion of said cylinder by a spring 98 which at one end engages the upper side of said piston and at the other with a suitably recessed cylinder head 99 having a sloping, external surface. The piston rod 97, which functions as a lift pin in the manner hereinafter described, and which will be so denoted, passes upwardly through the head 99 and is enlarged on its upper end as at 100, the head 100 being normally retained within an opening 101 provided in a pattern plate 102 which is secured to the upper side of the base 84 by means of cap screws 103.

An annular housing 104 is axially positioned within the base 84 and at its lower end is flanged inwardly as at 105. Disposed within the housing 104 is a cylinder 106 having an annular, external flange 107 which engages with the underside of the flange 105 to prevent upward movement of said cylinder. Within the cylinder 106, a coiled spring 108 is seated at one end on the upper surface of the base plate 81 and at the upper end engages with the underside of a piston 109 which is slidably mounted in said cylinder. The rod 110 of said piston, hereinafter denoted as the sprue pin, passes upwardly through a suitable ring packing 111 and through an opening 112 provided in the pattern plate 102. Normally, as shown clearly in Fig. 2, the sprue pin 110 is maintained in extended position, one in which said pin projects above the upper surface of the plate 102, by the spring 108. Above the piston 109, the cylinder 106 is provided with a passage 113 which communicates by means of a pipe 114 with the T-fitting 91, which fitting is disposed on the admitting valve side of the reducing valve 90. Accordingly, when the knee valve 94 is operated to admit air pressure to the pipe 93, a higher pressure will be admitted to the sprue pin cylinder than to the several lift pin cylinders.

Figure 3:
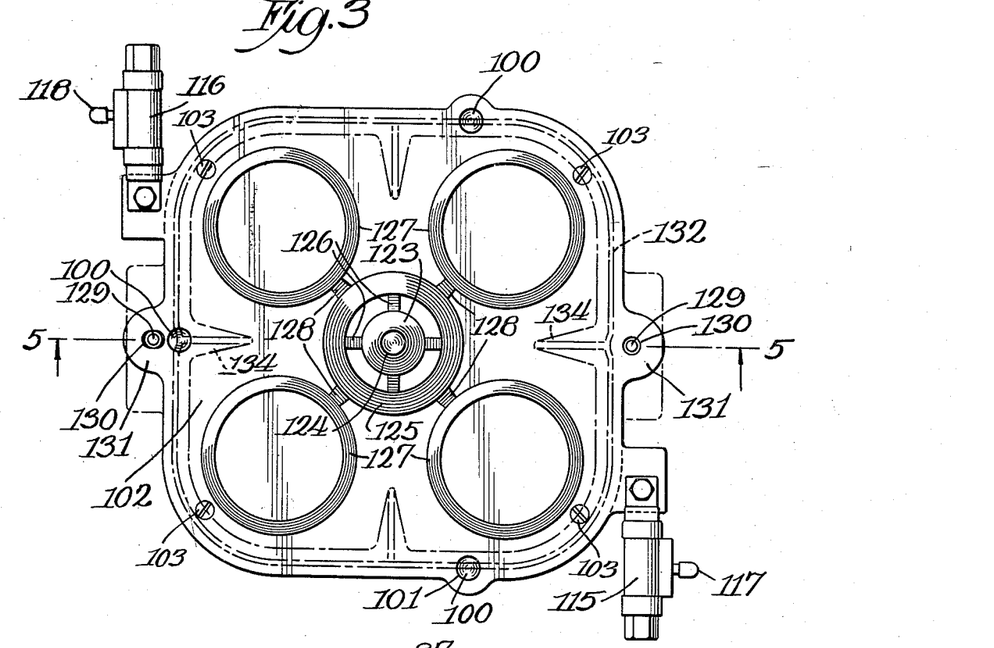
Fig. 3 is a plan view of the pattern plate and the vibrating attachments therefor, the relation of the sand flask to said plate being indicated by dotted line.
Figure 4:
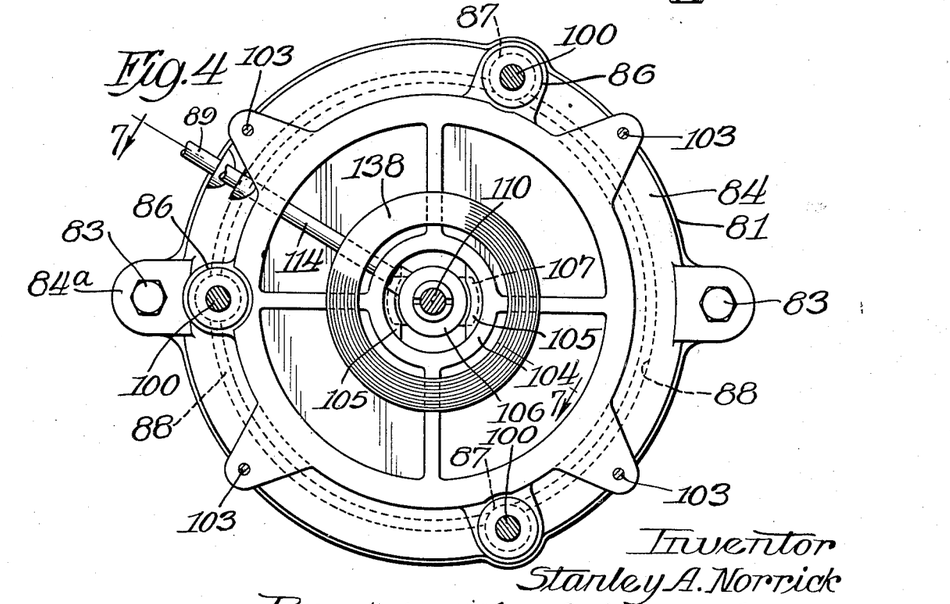
Fig. 4 is a section along the lines 4—4 in Fig. 2, looking in the direction of the arrows, and showing the position relation of the lift pin cylinders beneath the pattern plate.

The pattern plate 102 may have any desired shape, but is preferably square with rounded corners, as shown clearly in Fig. 3. At opposite corners of said plate, vibrators 115 and 116 are secured in any approved manner, the vibrator 115 being connected by a hose 117 to a T-fitting 119 and the vibrator 116 being connected by a hose 118 to said fitting. The fitting 119 is connected by a pipe 120 with a valve 121 whose operation is controlled by a hand lever 122. The valve 121 is connected by the hose 68 to the source of air supply as hereinbefore described. The vibrators 115 and 116 may have any desired form of construction, but for this type of work, it is preferable to use small, air-operated hammers which impart a slight jar to the pattern plate during the separation of the mold therefrom for the purpose of overcoming the friction of the sand.

Formed integrally with the plate 102 and projecting from the upper surface thereof is a plurality of appropriately shaped and disposed bosses which create the necessary depressions in the sand during the squeezing operation. Specifically, a frusto-conical boss 123 is formed on said plate in axial alignment with the sprue pin 110 and is provided with a hole 124 through which said pin operates. Concentrically disposed with reference to the boss 123 is a ring-shaped boss 125 having a generally trapezoidal section with the smaller face uppermost and which is connected to the boss 123 by four ribs 126 arranged in opposite pairs, each pair being parallel to a side of said plate. Each rib 126 will also have a trapezoidal section and the depth thereof will generally be less than the depth of the ring boss 125. Referring to Fig. 3, four ring-shaped bosses 127 are positioned around the vertical axis of the plate 102, each boss having a trapezoidal section and connected to the central ring boss 125 by a rib 128. There are four of the last-named ribs, arranged in opposite pairs with reference to the boss 125 and each of said ribs connect with the boss 125 at a point between the connections of the ribs 126 with said boss, as shown clearly in Fig. 3.

Figure 11:
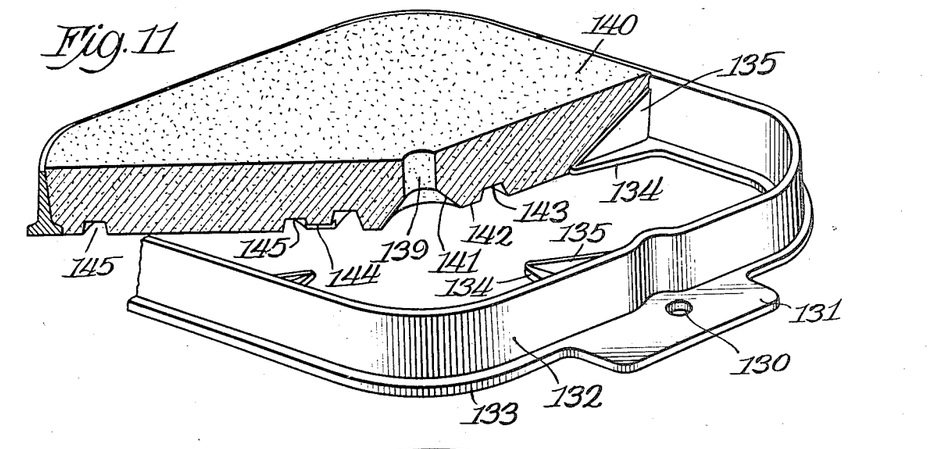
Fig. 11 is a fragmentary, perspective view, partly in section, of the sand flask and the mold carried thereby.
Figure 12:
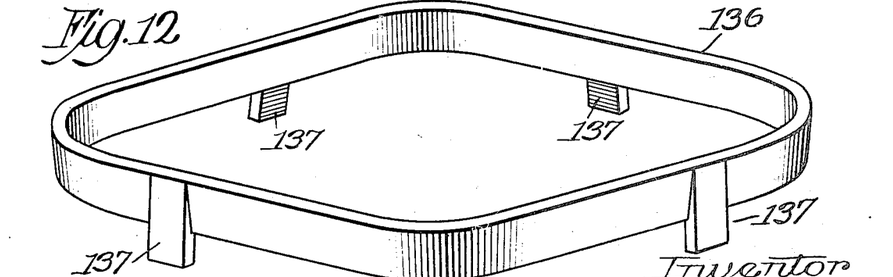
Fig. 12 is a perspective view of the upset ring which is placed over and on the flask during the filling of the latter with sand.

The plate 102 is further provided with a pair of centering pins 129 which register with holes 130 formed in a sand flask 132, said holes being specifically provided in extensions 131 provided on said flask. The sand flask 132 is more clearly shown in Fig. 11 and comprises an upstanding web portion which is flanged inwardly and outwardly at its lower ends as at 133. Four inward extensions, disposed in opposite pairs, 134, are formed on said flask and are connected to the inner wall thereof by ribs 135 which serve to strengthen the flask 132 against the outward pressure which obtains during the squeezing operation. In order to insure the presence of a sufficient depth of sand within the flask 132 during the aforenoted operation, an upset ring 136, formed as a simple band, is provided to rest on the upper edge of the flask 132 and includes a plurality of lugs 137 which guidably position said ring on said flask and prevent lateral movement of the former. It should be further noted at the present time that the underside of the pattern plate 102 is also provided with a heater ring 138 which is generally similar to the ring 42 provided on the squeeze plate 34.

Figure 1:
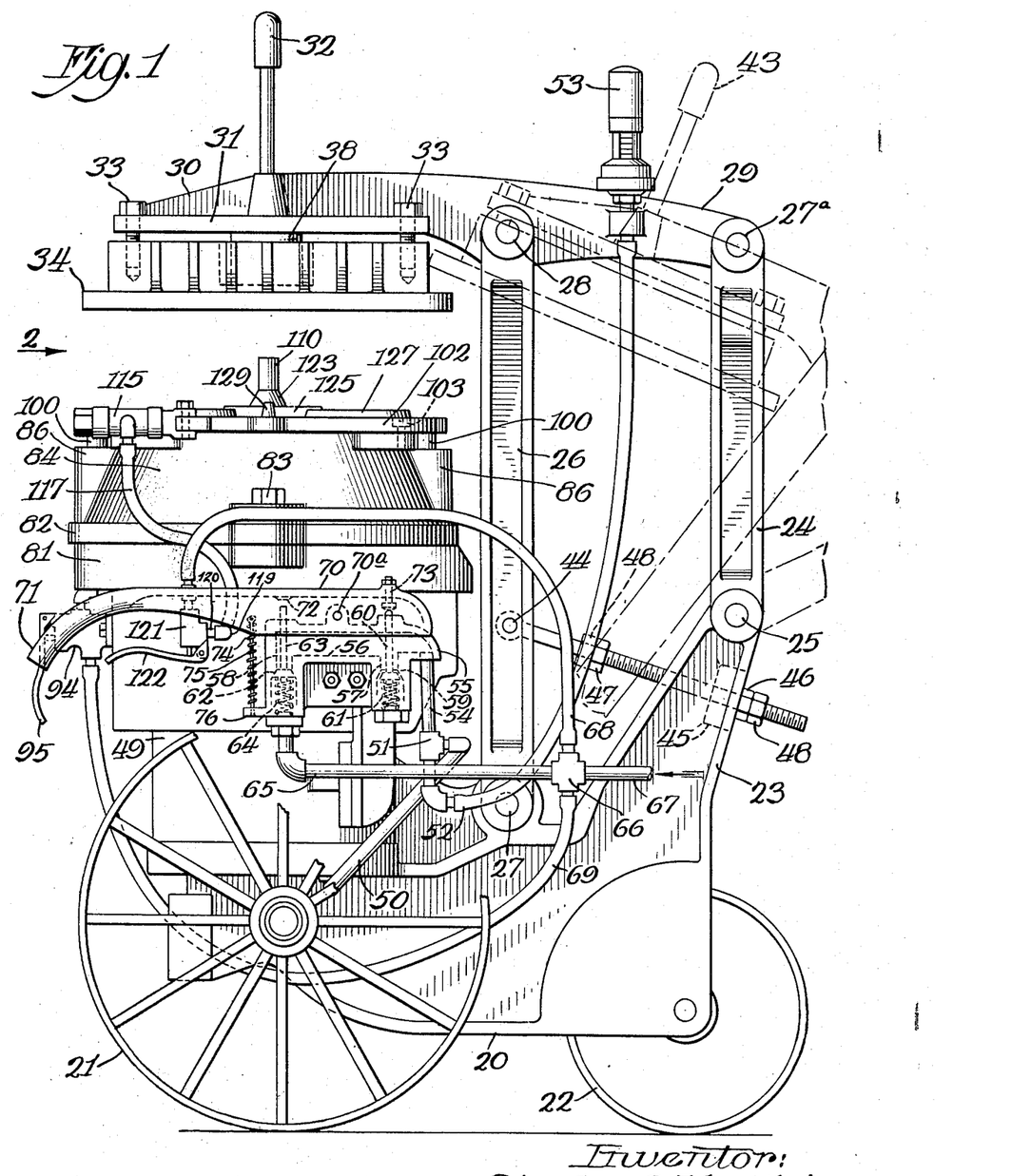
Figure 1 is a side elevation of my improved molding machine, showing the upper squeezing head in position, but with the sand flask removed.
Figure 2:
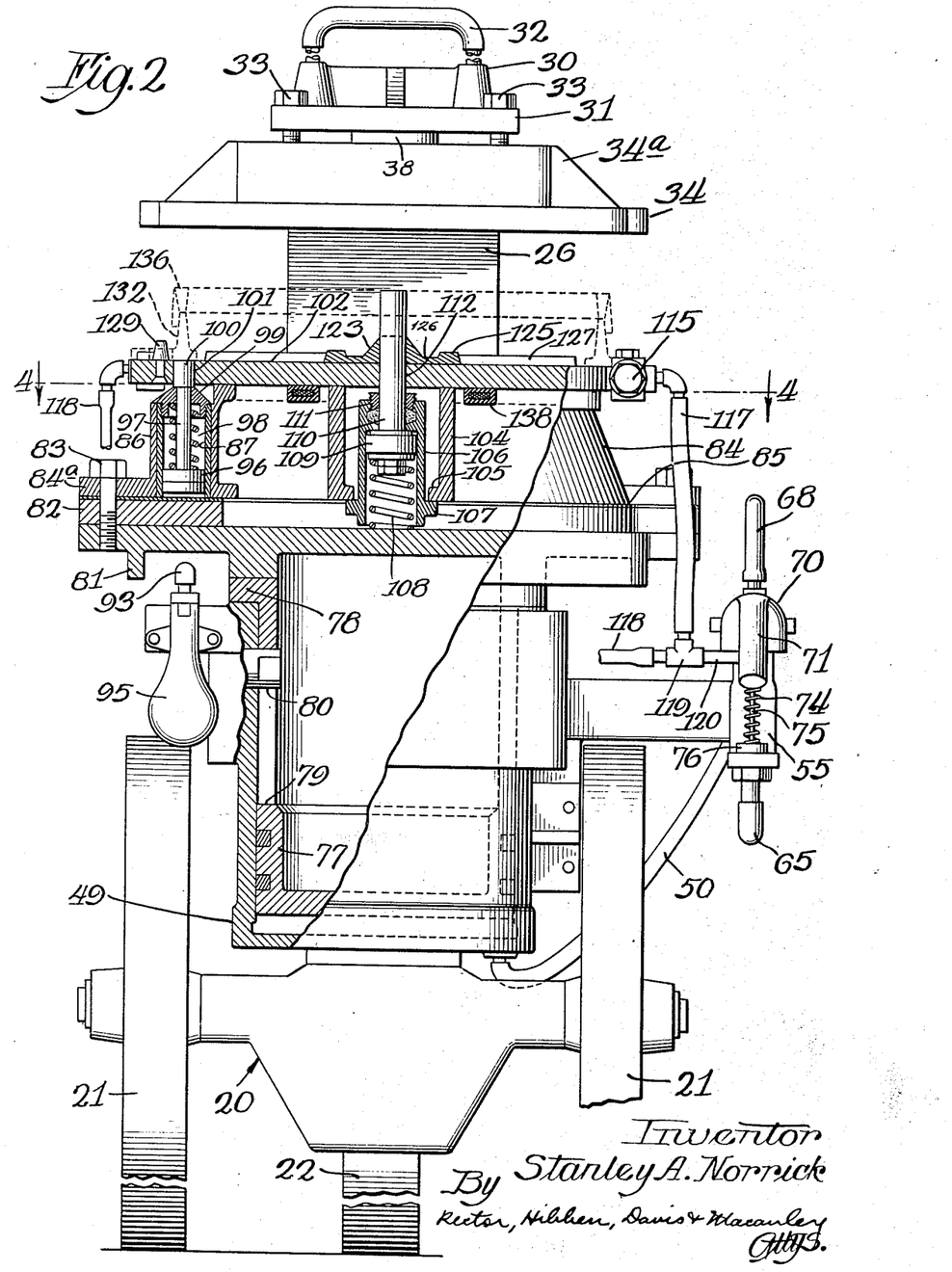
Fig. 2 is an enlarged, front elevation of the machine, partly in section, looking in the direction of the arrow 2 in Fig. 1.
Figure 5:
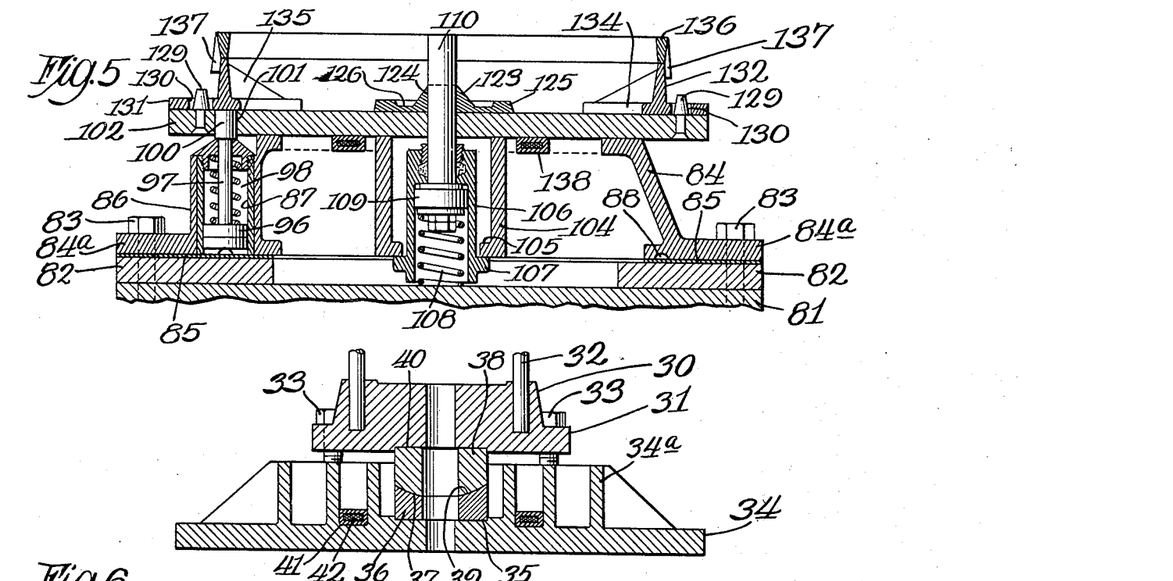
Fig. 5 is a section along the line 5—5 in Fig. 3, looking in the direction of the arrows, and showing the upset ring in superimposed relation to the sand flask preliminary to filling the latter with sand.

The operation of my improved molding machine will now be described:

The initial positions of the several parts of the machine are as generally indicated in Figs. 1 and 2, except that the squeeze plate 34 has been moved to its rearward position indicated by the numeral 43 in Fig. 1. This retraction of the squeezing plate facilitates the placing of the sand within the flask 132. At this time, current will be passing through the heaters 42 and 138 for the purpose of sufficiently warming the squeeze plates 34 and pattern plate 102 so that the damp sand will not adhere thereto when these parts are separated as hereinafter described. The flask 132 having been placed in position and the upset ring 136 placed thereon, as shown clearly in Fig. 5, a sufficient amount of facing sand will be riddled into said flask to completely cover the several bosses formed on the upper side of the plate 102 and to a sufficient depth such that when the sand is squeezed, there will still only be facing sand in actual contact with the face of the pattern, thereby insuring a smooth casting. The remainder of the flask up to the height of the upset ring 136 is filled with floor or black, sand, after which the top surface of the sand is struck off smooth by any suitable instrument. At this time, it will be remembered that the sprue pin 110 is in extended position, or one in which it projects upwardly through the sand within the flask, while the lift pins 97 are in retracted positions or those in which the heads 100 thereof are located immediately below the flanged portion 133 of the flask 132, all of these positions being shown clearly in Fig. 5.

Figures 6, 7:
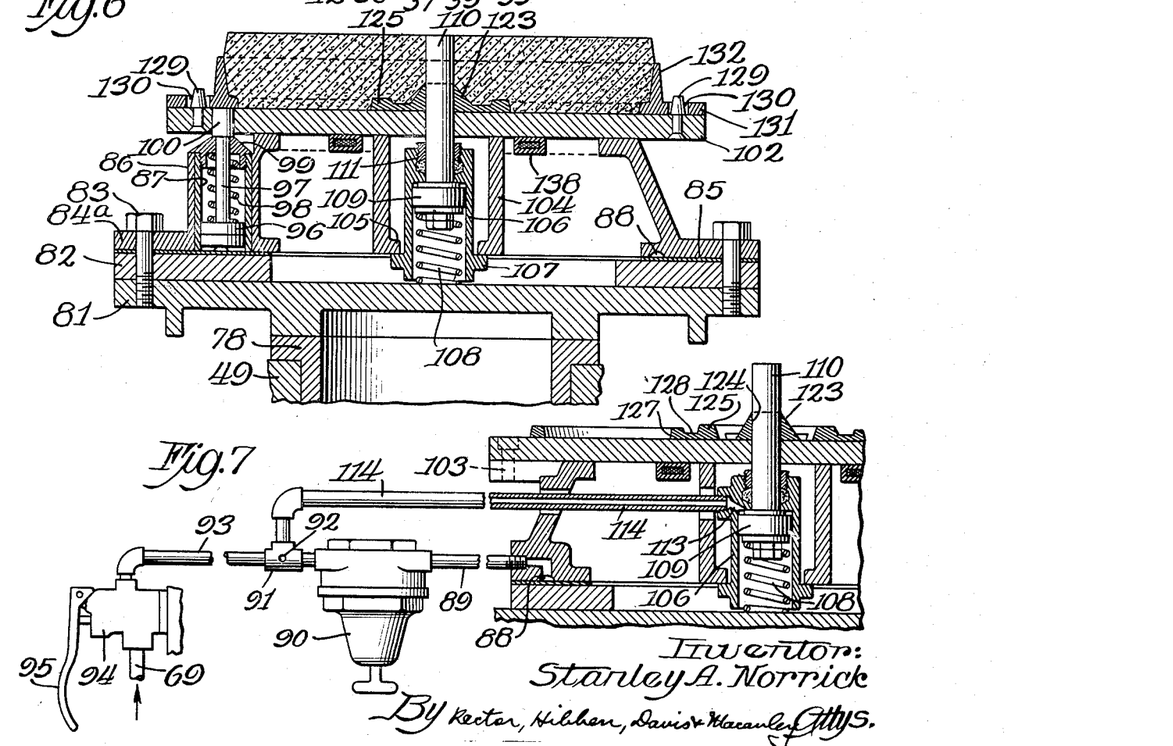
Fig. 6 is a sectional view similar to that shown in Fig. 5 and showing the flask filled with sand, the upset ring having been removed, and the upper squeezing head in position for effecting the ramming operation.
Fig. 7 is a section along the line 7—7 in Fig. 4, looking in the direction of the arrows, and showing the valve mechanism and pressure line for supplying fluid to the lift pin and sprue pin cylinders.
Figure 8:
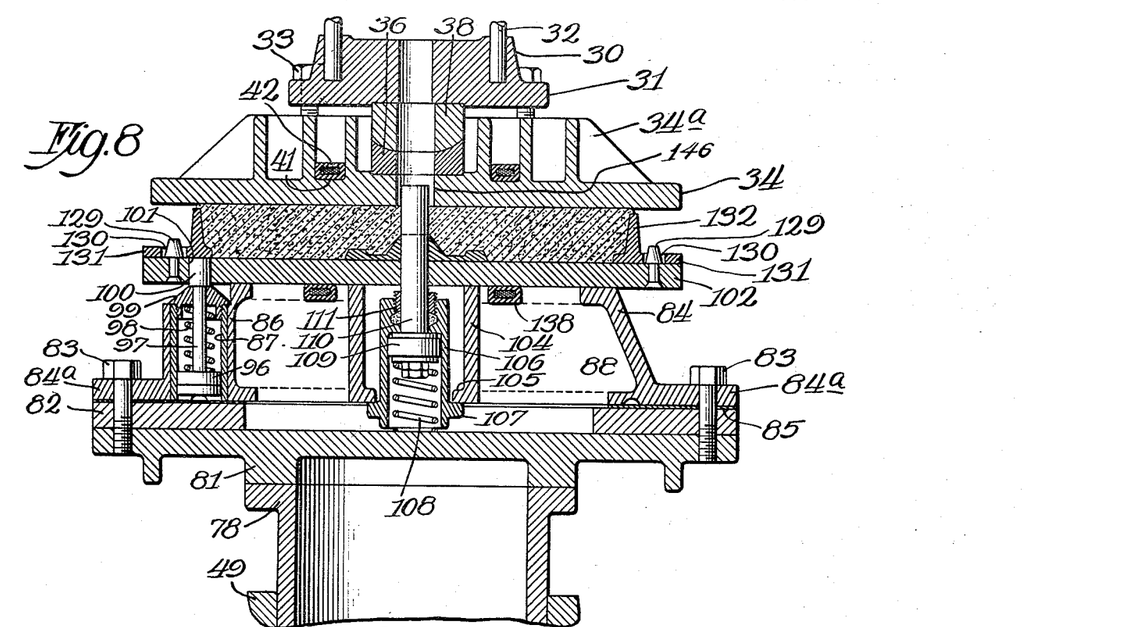
Fig. 8 is a sectional view, similar to that shown in Fig. 6, and illustrating the squeezing members in cooperative relation for packing the sand around the pattern plate.

The ring 136 is then removed and the squeeze plate 34 pulled forward to the position shown in Fig. 1, the relation of said plate and the filled sand flask 132 being then as shown in Fig. 6, with the body of the sand extending upwardly beyond the upper edge of said flask. The operator standing in front of the machine, or toward the left as viewed in Fig. 1, then actuates the hand grip 71 of the valve handle 70 downwardly to thereby close the exhaust valve 60 and open the inlet valve 63, thus admitting air pressure to the cylinder 49 beneath the piston 77 and also delivering air pressure to the pop valve 53, which pressure has not yet reached a point at which it will operate said valve. The pressure within the cylinder 49 then moves the piston 77 and the entire structure supported thereby, including the filled sand flask, upwardly to effect a squeezing, or ramming, of the sand within said flask against the plate 34, as shown in Fig. 8, the sprue pin 110 entering a hole 146 provided in the plate 34. It will be apparent from an examination of Fig. 1 that the aforesaid upward movement of the several parts against the squeeze plate 34 will not tend to move the latter element from its position by reason of the character of its linkage support on the frame 20, the movement being entirely in a vertical direction with no component of the actuating force being exerted in a lateral direction.

The squeezing position being as shown in Fig. 8, the next step in the operation of the machine is to effect a separation of the formed mold within the flask 132 from the pattern plate 102. To accomplish this result, the operator actuates the hand lever 122 and the knee lever 95 at the the same time, thereby admitting air to the vibrators 116 to slightly jar the plate 102 and also admitting air to the lift pin cylinders 86 and sprue pin cylinder 106. It should be observed, when the parts have reached the position shown in Fig. 8, the pop valve 53 will have been so adjusted as to automatically relieve the pressure within the cylinder 49 so as to prevent undue strain on the several parts of the machine from a continued application of the high pressure. The air pressure which has been admitted to the sprue cylinder 106 will begin to retract the sprue pin 110 from the hole 139 formed thereby in the packed sand, which hole constitutes the pouring gate of the mold. Likewise, the pressure which has been admitted to the lift pin cylinders 86 will begin to actuate the pistons 96 to thereby exert through the lift pins 97 a pressure on the under side of the flask 132. In the meantime, the operator will have released the hand valve 70 which thereupon returns to the position shown in Fig. 1, or one in which the valve 60 is opened to exhaust said cylinder. The piston 77 thereupon begins to move downwardly under the weight of the parts carried thereby, which movement, taken in conjunction with the fact that pressure exists within the lift pin cylinders, effects a separation of the flask and the mold carried thereby from the pattern plate 102, the several lift pins 97 holding said flask against the underside of the squeeze plate 34.

Figure 9:
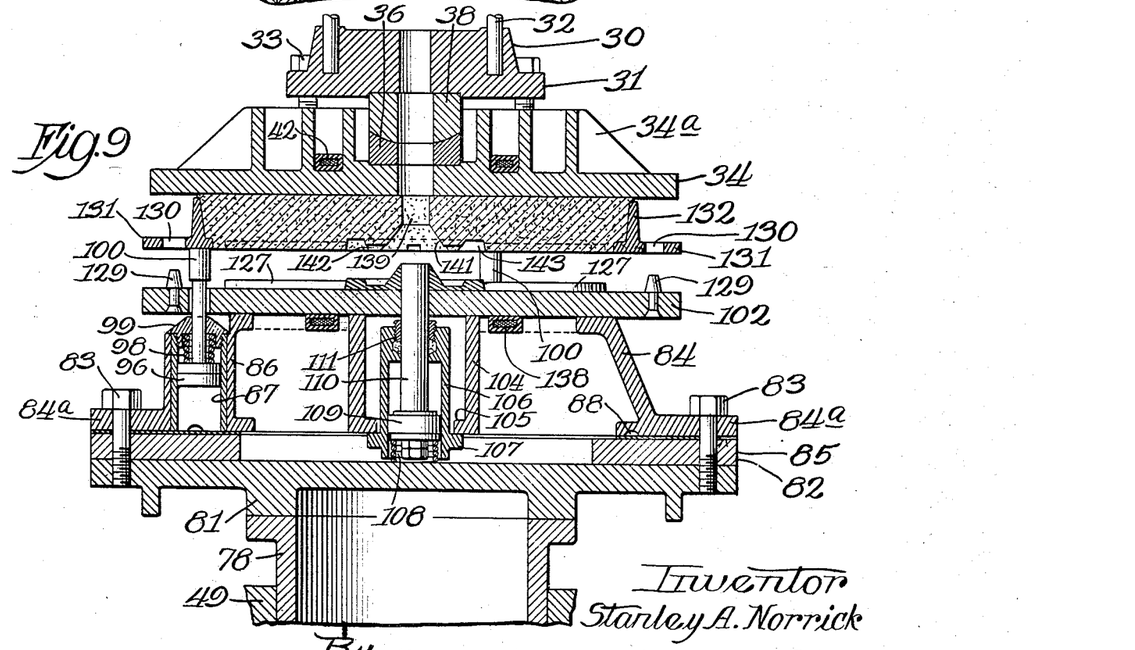
Fig. 9 is a sectional view, similar to that shown in Fig. 8, and illustrating the manner of effecting a separation of the formed mold from the pattern plate.
Figure 10:
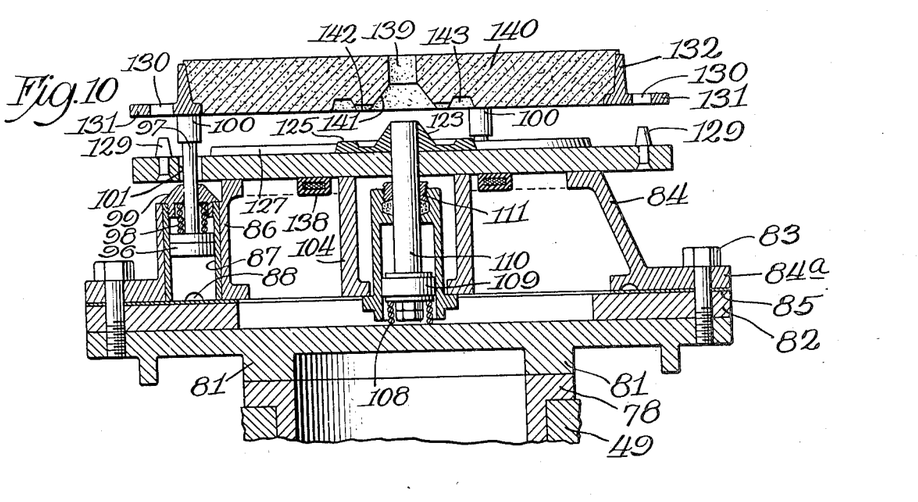
Fig. 10 is a sectional view, similar to that shown in Fig. 9, and illustrating a step in the operation of the machine which is successive to that shown in Fig. 9, the formed mold being in separated position from the pattern plate and the upper squeezing head having been retracted to permit removal of the flask.

The positions of the several parts are then as shown in Fig. 9, with the piston 77 still displaced from its normally retracted position. When the piston 77 has moved downwardly a distance which is substantially equal to the maximum travel of the pistons 96 within the lift pin cylinders 86, the whole structure carried by said piston, including the flask 132 with its mold 140, moves downwardly together until said piston reaches its lowermost position. The positions of the several parts under consideration are then as shown in Fig. 10, with air pressure still present in the sprue and lift pin cylinders and the sprue pin accordingly in a retracted position and the sand flask spaced vertically from the upper surface of the pattern plate. The squeeze plate 34 and the head 30 can then be moved rearwardly and the completed mold 140 removed from the machine, whereupon the knee lever 95 may be released and the air in the sprue and lift pin cylinders will be exhausted through the bleed hole 92. The sprue and lift pins will thereupon be returned to their normal positions by the indicated springs.

As before noted, during the squeezing operation, the sprue pins 110 create the pouring gate 139 of the mold 140. Similarly, the frusto-conical boss 123 creates a similarly-shaped depression 141 which is axially aligned with the gate 139. The ribs 126 form the channels 142 and the central ring boss 125 forms the annular channel 143. The ribs 128 form the channels 144 which connect the channel 143 with the several ring channels 145 which receive the hot metal for the casting of individual piston rings. The several bosses on the upper surface of the pattern plate 102 are provided with tapering sides in order to give sufficient draft to effect an easy and clean separation of the mold from said plate.

In the actual casting of the rings, a plurality of the molds 140 are placed in superimposed relation with the pouring gates 139 of all the molds in axial alignment. The hot metal is then poured through the common gate so formed and is distributed in each mold by the circuitous route defined by the annular channel 143 and the several straight channels 142 and 144. The annular channel 143 functions to some extent as a pouring gate for each ring mold, preliminary to the delivery of the metal into the individual channels for each ring, thus quieting the hot metal, checking its flow to some extent, and preventing the splash that would otherwise ensue if the metal were poured directly in the ring mold. The channels 144 serve as local gates for delivering the hot metal to the individual channels 145 and owing to their depth being less than either the channel 145 or the channel 143, function generally as skimming gates.

The operation of the machine throughout the molding and releasing steps is wholly mechanical and completely under the control of the operator at all times. Moreover, the simultaneous delivery of fluid pressure to the lift pin cylinders and its actuation of the equi-diameter pistons, whose rods engage the sand flask in a plurality of peripheral locations, insures a true axial lifting, or separation, of this element and the enclosed, formed mold from the pattern plate, free from the possibility of any distortable action. As an auxiliary to the attainment of the above result, air is delivered to the lift pin cylinders at a lower pressure by means of the reducing valve, so that the separation of the mold and pattern plate is gently effected without exerting excessive strain on the flask. During the separating movement, it will be particularly noted that the mold is literally clamped in position, which results in a controlled and precise manner of effecting this phase of the operation and a complete absence of shock, or violent movement of any kind. The formed molds, therefore, are not only of a superior character, but the construction nature of the machine permits their production with rapidity.

While I have shown one set of elements and combinations thereof for effectuating my improved molding machine, it will be understood that the same is intended for purpose of illustration only and in no wise to restrict my device to the exact forms and structures shown, for many changes may be made therein without departing from the spirit of my invention.

I claim:

1. In a molding machine, the combination of a pair of squeezing members, means for supporting a pattern and a sand flask between said members, a plurality of cylinders carried by one of said members, the pistons in said cylinders excepting one having rods for engaging with said flask to move the same and the piston in said excepted cylinder having a rod normally extending through said pattern within the margin of said flask for forming the pouring gate of said mold, means for operating said members to compress the sand around said pattern to form a mold, and means for supplying fluid to said cylinders for moving said pistons to separate said mold from the pattern, and for retracting said gate forming rod from said mold.

2. In a molding machine, the combination of a pair of squeezing members, means for supporting a pattern and a sand flask between said members, a plurality of cylinders carried by one of said members, the pistons in said cylinders excepting one having rods for engaging with said flask to move the same and the piston in said excepted cylinder having a rod normally extending through said pattern within the margin of said flask for forming the pouring gate of said mold, means for operating said members to compress the sand around said pattern to form a mold, and means for supplying fluid to said cylinders for moving said pistons to separate said mold from the pattern during the releasing movement of said members, and for retracting said gate forming rod from said mold.

3. In a molding machine, the combination of a pair of squeezing members, means for supporting a pattern and a sand flask between said members, a plurality of cylinders carried by one of said members, pistons in said cylinders excepting one having rods for engaging with said flask and the piston in said excepted cylinder having a rod normally extending through said pattern within the margin of said flask for forming the pouring gate of said mold, means for operating said members to compress the sand around said pattern to form a mold, and means for supplying fluid to said cylinders for holding said pistons in a position to maintain said flask against one of said squeezing members during the releasing movement of the other, thereby effecting a separation of said mold and pattern, and for retracting said gate forming rod from said mold.

4. In a molding machine, the combination of a pair of squeezing members, means for supporting a pattern and a sand flask between said members, a plurality of cylinders carried by one of said members, pistons in said cylinders excepting one having rods for engaging with said flask and the piston in said excepted cylinder having a rod normally extending through said pattern within the margin of said flask for forming the pouring gate of said mold, means for holding one of said members and operating the other to compress the sand around said pattern between said members to form a mold, and means for supplying fluid to said cylinders for holding said pistions in a position to maintain said flask against said held squeezing member during the releasing movement of the other, thereby effecting a separation of said mold and pattern, and for retracting said gate forming rod from said mold.

5. In a molding machine, the combination of a pair of squeezing members, a pattern plate and a sand flask supported by one of said members, a plurality of cylinders carried by said last-named member, the pistons in said cylinders excepting one having rods for engaging with said flask to move the same and normally retracted within said last-named member and the piston in said excepted cylinder having a rod normally extending through said pattern within the margin of said flask for forming the pouring gate of said mold, means for operating said members to compress the sand around said plate to form a mold, and means for supplying fluid to said cylinders for moving said pistons to separate said mold from the plate, and for retracting said gate forming rod from said mold.

6. In a molding machine, the combination of a pair of squeezing members, a pattern plate and a sand flask supported by one of said members, a plurality of cylinders carried by said last-named member, pistons in said cylinders excepting one having rods for engaging with said flask to move the same and normally retracted within said last-named member and the piston in said excepted cylinder having a rod normally extending through said pattern within the margin of said flask for forming the pouring gate of said mold, means for operating said member to compress the sand around said plate to form a mold, and means for supplying fluid to said cylinders for moving said pistons to separate said mold from said plate during the releasing movement of said members, and for retracting said gate forming rod from said mold.

7. In a molding machine, the combination of a pair of squeezing members, a pattern plate and a sand flask supported by one of said members, a plurality of cylinders carried by said last-named member, the pistons in said cylinders excepting one having rods for engaging with said flask and normally retracted within said last-named member and the piston in said excepted cylinder having a rod normally extending through said pattern within the margin of said flask for forming the pouring gate of said mold, means for operating said members to compress the sand around said plate to form a mold, and means for supplying fluid to said cylinders for holding said flask against one of said squeezing members during the releasing movement of the other, thereby effecting a separation of said mold and plate, and for retracting said gate forming rod from said mold.

8. In a molding machine, the combination of a pair of squeezing members, a pattern plate and a sand flask supported by one of said members, a cylinder carried by said last-named member, the piston in said cylinder having a rod normally extending beyond the surface of said last-named member within the margin of said flask, means for operating said members to compress the sand around said plate and rod to form the mold and pouring gate therefor, respectively, and means for supplying fluid to said cylinder for retracting said rod from the gate formed thereby.

9. In a molding machine, the combination of a pair of squeezing members, a pattern plate and a sand flask supported by one of said members, a cylinder carried by said last-named member, a piston in said cylinder having a rod normally extending beyond the surface of said last-named member within the margin of said flask, means for operating said members to compress the sand around said plate and rod to form the mold and pouring gate therefor, respectively, means for releasing said members, and means for supplying fluid to said cylinder for retracting said rod from the gate formed substantially coincident with the initiation of the releasing movement of said members.

10. In a molding machine, the combination of a pair of squeezing members, a pattern plate and a sand flask supported by one of said members, a plurality of equi-diameter cylinders carried by said last-named member, the pistons in said cylinders having rods for engaging with said flask to move the same and normally retracted within said last-named member, another cylinder carried by said last-named member, the piston in said last-named cylinder having a rod normally extending beyond the surface of said last-named member within the margin of said flask, means for operating said members to compress the sand around said plate and rod to form the mold and pouring gate therefor, respectively, and means for supplying fluid simultaneously to all of said cylinders to separate said mold from said plate and for retracting said last-named rod from the gate formed thereby, respectively.

11. In a molding machine, the combination of a pair of squeezing members, a pattern plate and a sand flask supported by one of said members, a plurality of equi-diameter cylinders carried by said last-named member, the pistons in said cylinders having rods for engaging with said flask to move the same and normally retracted within said last-named member, another cylinder carried by said last-named member, the piston in said cylinder having a rod normally extending beyond the surface of said last-named member within the margin of said flask, means for operating said members to compress the sand around said plate and rod to form the mold and pouring gate therefor, respectively, and means for simultaneously supplying fluid to all of said cylinders during the releasing movement of said members for effecting a separation of said mold from said plate and for retracting said last-named rod from the gate formed thereby, respectively.

12. In a molding machine, the combination of a pair of squeezing members, a pattern plate and a sand flask supported by one of said members, a plurality of equi-diameter cylinders carried by said last-named member, the pistons in said cylinders having rods for engaging with said flask and normally retracted within said last-named member, another cylinder carried by said last-named member, the piston in said cylinder having a rod normally extending beyond the surface of said last-named member within the margin of said flask, means for operating said member to compress the sand around said plate and rod to form the mold and pouring gate therefor, respectively, and means for simultaneously supplying fluid to all of said cylinders for effecting a separation of said mold from said plate by holding said flask against one of said squeezing members during a releasing movement of the other and for retracting said last-named rod from the gate formed thereby, respectively.

13. In a molding machine, the combination of a pair of squeezing members, a pattern plate and a sand flask supported by one of said members, a plurality of equi-diameter cylinders carried by said last-named member, the pistons in said cylinders having rods for engaging with said flask and normally retracted within said last-named member, another cylinder carried by said last-named member, a piston in said cylinder having a rod normally extending beyond the surface of said last-named member within the margin of said flask, means for operating said members to compress the sand around said plate and rod to form the mold and pouring gate therefor, respectively, and means for simultaneously supplying fluid to all of said cylinders for effecting a separation of said mold from said plate by holding said flask against one of said squeezing members and for retracting said last-named rod from the gate formed thereby, respectively, substantially at the moment when the other of said squeezing members begins its releasing movement.

14. In a molding machine, the combination of a member, a pattern and a sand flask supported thereby, a plurality of cylinders carried by said member, the pistons in said cylinders excepting one having rods for engaging with said flask to move the same and the piston in said excepted cylinder having a rod normally extending through said pattern within the margin of said flask for forming the pouring gate of said mold, and means for supplying fluid to said cylinders for moving said pistons to separate the formed mold from said pattern and for retracting said gate-forming rod from said mold.

15. In a molding machine, the combination of a member, a pattern and a sand flask supported thereby, a cylinder carried by said member, a piston in said cylinder having a rod normally extending beyond the surface of said member within the margin of said flask for creating the pouring gate of the mold, and means for supplying fluid to said cylinder for retracting said rod from the gate formed thereby.

16. In a molding machine, the combination of a member, a pattern and a sand flask supported thereby, a plurality of equi-diameter cylinders carried by said member, the pistons in said cylinders having rods for engaging with said flask to move the same, another cylinder carried by said member, the piston in said cylinder having a rod normally extending beyond the surface of said last-named member within the margin of said flask for creating the pouring gate of the mold, and means for simultaneously supplying fluid to all of said cylinders for moving said first-named piston to separate said mold from said pattern and for moving said last-named piston for retracting said last-named rod from the gate formed thereby.

17. In a molding machine, the combination of a pair of squeezing members, a pattern plate and a sand flask supported by one of said members, a plurality of equi-diameter cylinders carried by said last-named member beneath said plate and equally spaced around the margin of said plate, the pistons in said cylinders excepting one having rods for engaging with said flask to move the same and normally retracted within said last-named member and the piston in said excepted cylinder having a rod normally extending through said pattern within the margin of said flask for forming the pouring gate of said mold, means for operating said members to compress the sand around said pattern plate to form a mold, and means for supplying fluid to said cylinders for moving said pistons to separate said mold from the plate and for retracting said gate forming rod from said mold.

18. In a molding machine, the combination of a pair of squeezing members, a pattern plate and a sand flask supported by one of said members, a plurality of equi-diameter cylinders carried by said last-named member, the pistons in said cylinders having rods for engaging with said flask to move the same and normally retracted within said last-named member, another cylinder carried by said last-named member, the piston in said last-named cylinder having a rod normally extending beyond the surface of said last-named member within the margin of said flask, means for operating said members to compress the sand around said plate and rod to form the mold and pouring gate therefor, respectively, and means for supplying fluid simultaneously to all of said cylinders to separate said mold from said plate and for retracting said last-named rod from the gate formed thereby, respectively, the fluid delivered to said equi-diameter cylinders having a lower pressure than that delivered to said last-named cylinder.

19. In a molding machine, the combination of a pair of squeezing members, a pattern plate and a sand flask supported by one of said members, a plurality of equi-diameter cylinders carried by said last-named member, the pistons in said cylinders having rods for engaging with said flask and normally retracted within said last-named member, another cylinder carried by said last-named member, the piston in said cylinder having a rod normally extending beyond the surface of said last-named member within the margin of said flask, means for operating said member to compress the sand around said plate and rod to form the mold and pouring gate therefor, respectively, and means for simultaneously supplying fluid to all of said cylinders for effecting a separation of said mold from said plate by holding said flask against one of said squeezing members during a releasing movement of the other and for retracting said last-named rod from the gate formed thereby, respectively, the fluid delivered to said equi-diameter cylinders having a lower pressure than that delivered to said last-named cylinder.

20. In a molding machine, the combination of a pair of squeezing members, means for supporting a pattern and a sand flask between said members, a plurality of cylinders carried by one of said members, the pistons in said cylinders excepting one having rods for engaging with said flask to move the same and the piston in said excepted cylinder having a rod normally extending through said pattern within the margin of said flask for forming the pouring gate of said mold, means for operating said members to compress the sand around said pattern to form a mold, and means for supplying fluid to all of said cylinders for moving said pistons to separate said mold from the pattern and for retracting said gate forming rod from said mold, the fluid delivered to said first-named cylinders having a lower pressure than that delivered to said last-named cylinder.

21. In a molding machine, the combination of a pair of squeezing members, a pattern plate and a sand flask supported by one of said members, a plurality of equi-diameter cylinders carried by said last-named member, the pistons in said cylinders having rods for engaging with said flask to move the same and normally retracted within said last-named member, another cylinder carried by said last-named member, the piston in said last-named cylinder having a rod normally extending beyond the surface of said last-named member within the margin of said flask, means for operating said members to compress the sand around said plate and rod to form the mold and pouring gate therefor, respectively, and means for supplying fluid simultaneously to all of said cylinders during the releasing movement of said members for effecting a separation of said mold from said plate and for retracting said last-named rod from the gate formed thereby, respectively, the fluid delivered to said equi-diameter cylinders having a lower pressure than that delivered to said last-named cylinder.

22. In a molding machine, the combination of a pair of squeezing members, a pattern plate and a sand flask supported by one of said members, a plurality of equi-diameter cylinders carried by said last-named member, the pistons in said cylinders having rods for engaging with said flask and normally retracted within said last-named member, another cylinder carried by said last-named member, the piston in said cylinder having a rod normally extending beyond the surface of said last-named member within the margin of said flask, means for operating said members to compress the sand around said plate and rod to form the mold and pouring gate therefor, respectively, and means for simultaneously supplying fluid to all of said cylinders for effecting a separation of said mold from said plate by holding said flask against one of said squeezing members during a releasing movement of the other and for retracting said last-named rod from the gate formed thereby, respectively, the fluid delivered to said equi-diameter cylinders having a lower pressure than that delivered to said last-named cylinder.

23. In a molding machine, the combination of a pair of squeezing members, a pattern plate and a sand flask supported by one of said members, a plurality of equi-diameter cylinders carried by said last-named member, the pistons in said cylinders having rods for engaging with said flask and normally retracted within said last-named member, another cylinder carried by said last-named member, a piston in said cylinder having a rod normally extending beyond the surface of said last-named member within the margin of said flask, means for operating said members to compress the sand around said plate and rod to form the mold and pouring gate therefor, respectively, and means for simultaneously supplying fluid to all of said cylinders for effecting a separation of said mold from said plate by holding said flask against one of said squeezing members and for retracting said last-named rod from the gate formed thereby, respectively, substantially at the moment when the other of said squeezing members begins its releasing movement, the fluid delivered to said equi-diameter cylinders having a lower pressure than that delivered to said last-named cylinder.

24. In a molding machine, the combination of a pair of squeezing members, means for supporting a pattern and a sand flask between said members, a plurality of cylinders carried by one of said members, the pistons in said cylinders excepting one having rods for engaging with said flask and the piston in said excepted cylinder having a rod normally extending through said pattern within the margin of said flask for forming the pouring gate of said mold, means for operating said members to compress the sand around said pattern to form a mold, and means for supplying fluid to said cylinders for holding said pistons substantially stationary relative to the associated member to thereby separate said mold from the pattern during the releasing movement of said last-named member and for retracting said gate forming rod from said mold.

In testimony whereof, I have subscribed my name,

STANLEY A. NORRICK.